US008844056B2

(12) United States Patent
Evenden et al.

(10) Patent No.: US 8,844,056 B2
(45) Date of Patent: Sep. 23, 2014

(54) SERVICE PROVISION (75) Inventors: Richard J Evenden, Ipswich (GB); Francis J Scahill, Ipswich (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 13/147,312

(22) PCT Filed: Feb. 1, 2010

(86) PCT No.: PCT/GB2010/000164
§ 371 (c)(1),
(2), (4) Date: Aug. 1, 2011

(87) PCT Pub. No.: WO2010/086625
PCT Pub. Date: Aug. 5, 2010

(65) Prior Publication Data
US 2011/0289599 A1    Nov. 24, 2011

(30) Foreign Application Priority Data

Jan. 30, 2009  (EP) ..................................... 09250249
Jan. 30, 2009  (GB) ................................... 0901585.0

(51) Int. Cl.
*G06F 21/24*   (2006.01)

(52) U.S. Cl.
USPC ........................................................... 726/29

(58) Field of Classification Search
USPC ........................................................... 726/29
See application file for complete search history.

(56) References Cited

U.S. PATENT DOCUMENTS

| | | | |
|---|---|---|---|
| 2004/0083366 A1 | 4/2004 | Nachenberg et al. | |
| 2004/0260754 A1 * | 12/2004 | Olson et al. | 709/200 |
| 2005/0055581 A1 * | 3/2005 | Larsen | 713/202 |
| 2006/0225137 A1 | 10/2006 | Odins-Lucas et al. | |
| 2006/0281542 A1 | 12/2006 | Aird et al. | |
| 2006/0294102 A1 | 12/2006 | Reddish et al. | |

(Continued)

FOREIGN PATENT DOCUMENTS

| | | |
|---|---|---|
| EP | 1 903 741 | 3/2008 |
| EP | 1 962 220 | 8/2008 |

(Continued)

OTHER PUBLICATIONS

International Search Report for PCT/GB2010/000164, mailed May 17, 2010.

(Continued)

*Primary Examiner* — Jeffrey Pwu
*Assistant Examiner* — Samuel Ambaye
(74) *Attorney, Agent, or Firm* — Nixon & Vanderhye, P.C.

(57) ABSTRACT

A method and system for service provision, including: a web browser in a first communications device (e.g. a personal computer) running a script from a source (e.g. a remote web server) trusted by the first communications device's user; sending, from the first device to a second communications device (e.g. a smartphone) that has a web server, a user-verified indication of the trusted source; sending, from the first device to the second device: a service request, for a service required by script currently running on the web browser, and an indication of the source of the current script; the second device comparing the indicated source of the current script to the indicated trusted source; and the second device providing the requested service only if the indicated source of the current script corresponds to the indicated trusted source.

17 Claims, 9 Drawing Sheets

(56) References Cited

U.S. PATENT DOCUMENTS

| | | | |
|---|---|---|---|
| 2007/0079361 A1 | 4/2007 | Hays et al. | |
| 2007/0107057 A1 | 5/2007 | Chander et al. | |
| 2008/0222299 A1 | 9/2008 | Boodaei | |
| 2008/0263650 A1* | 10/2008 | Kerschbaum | 726/9 |
| 2008/0320567 A1 | 12/2008 | Shulman et al. | |

FOREIGN PATENT DOCUMENTS

| | | |
|---|---|---|
| EP | 1 986 395 | 10/2008 |
| WO | 03/019413 | 3/2003 |
| WO | 03/098563 | 11/2003 |
| WO | 2006/048149 | 5/2006 |

OTHER PUBLICATIONS

Written Opinion of the International Searching Authority for PCT/GB2010/000164, mailed May 17, 2010.

Florian Kerschbaum Ed, et al., "Simple Cross-Site Attack Prevention", Security and Privacy in Communications Networks and the Workshops, (Sep. 17, 2007), pp. 464-472.

"Windows Script Host: New Code-Signing Features Protect Against Malicious Scripts", Microsoft Article, 2013 Microsoft Corporation (6 pgs.).

Jovanovic, Nenad et al., "Preventing Cross Site Request Forgery Attacks", Secure Systems Lab, Technical University of Vienna, 2006 IEEE (10 pgs.).

Kerschbaum, Florian, "Simple Cross-Site Attack Prevention", SAP Research, Karlsruhe, Germany, date unknown (10 pgs.).

Kirda, Engin et at. "Noxes: A Client-Side Solution for Mitigating Cross-Site Scripting Attacks", Technical University of Vienna and University of California, Santa Barbara, *SAC '06* Apr. 23-27, 2006, Dijon, France (8 pgs.).

NoScript Article "Inform Action Open Source Software", retrieved from http://web.archive.org/web/20071011014133/http://noscript.net/features, on May 5, 2009, © 2004-2007 InformAction.

Office Action (14 pgs.) dated Mar. 26, 2013 issued in co-pending U.S. Appl. No. 13/147,305.

International Search Report for PCT/GB2010/000162 mailed May 18, 2010.

* cited by examiner

SERVICE PROVISION

TECHNICAL FIELD

This application is the U.S. national phase of International Application No. PCT/GB2010/000164 filed 1 Feb. 2010, which designated the U.S. and claims priority to EP Application No. 09250249.1 filed 30 Jan. 2009; and GB Application No. 0901585.0 filed 30 Jan. 2009, the entire contents of each of which are hereby incorporated by reference.

Certain exemplary embodiments relate to service provision. Certain exemplary embodiments relate in particular, but not exclusively, to service provision between web browsers and web servers.

BACKGROUND SUMMARY

A web browser operates to enable display of, and user interaction with, information provided by a web server. Typically the web browser and web server are connected via the Internet and/or other networks such as a local area network. Typically the web browser is an application operating as part of user equipment such as a personal computer, and the web server is located remotely under the control of a separate party and provides a website. One example of a web browser is "Internet Explorer" (trademark) provided by, Microsoft (trademark).

Web browsers may be implemented as software. So-called web browser plug-ins may be added to, or operated by, an existing web browser to provide additional functionality to the web browser.

A web browser may run script obtained from a web server. Cross-site scripting occurs for example when the script from a first website (i.e. from a first web server) operates to download content from a second website (i.e. from a second web server) to the web browser. The content may for example include images from the second web site and/or source <script> tags from the second web site.

Web servers are also implemented in some mobile devices, e.g. smartphones.

Security processes for access between plural entities are known, for example as disclosed in EP 1 903 741 (A1), WO 03098563 (A2) and IE 20020438 (A2).

Known security processes do not however alleviate risks presented to a device (e.g. a mobile device) with a web server when accessed by a web browser that is involved in cross-site scripting from web servers other than the device's web server or other operations involving plural web servers other than the device's web server.

In a first aspect, there is provided a method of service provision, comprising: a web browser, running in a first communications device, running a script that is from a source that is trusted by a user of the first communications device; sending, from the first communications device to a second communications device, a user-verified indication of the trusted source; sending, from the first communications device to the second communications device: a service request, for a service required by script currently running on the web browser, and an indication of the source of the current script; 35 the second communications device comparing the indicated source of the current script to the indicated trusted source; and the second communications device providing the requested service only if the indicated source of the current script corresponds to the indicated trusted source.

In a further aspect, there is provided a method for a first communications device to request a service from a second communications device, comprising: a web browser, running in the first communications device, running a script that is from a source that is trusted by a user of the first communications device; the first communications device sending a user-verified indication of the trusted source to the second communications device; and the first communications device sending, to the second communications device, the following: a service request, for a service required by script currently running on the web browser, and an indication of the source of the current script.

In a further aspect, there is provided a method for a second communications device to respond to a service request from a first communications device, comprising: the second communications device receiving a user-verified indication of a trusted source sent from the first communications device; the second communications device receiving, from the first communications device: a service request, for a service required by script currently running on a web browser, and an indication of the source of the current script; the second communications device comparing the indicated source of the current script to the indicated trusted source; and the second communications device providing the requested service only if the indicated source of the current script corresponds to the indicated trusted source.

The user-verified indication of the trusted source may comprise an indication of the trusted source encrypted with a password known to the first communications device and the second communications device.

The trusted source may be a remote web server.

A web server running in the second communications device may receive the user-verified indication of the trusted source, the service request, and the indication of the source of the current script.

If the second communications device performs the requested service, a service product may be produced which is forwarded to the first communications device.

The method may further comprise sending, from the second communications device to the first communications device, an indication of refusal of the requested service when the requested service is not provided by the second communications device due to the indicated source of the current script not corresponding to the indicated trusted source.

The method may further comprise: sending a user authorisation request from the second communications device to the first communications device; the first communications device obtaining authorisation from the user; sending a user authorisation from the first communications device to the second communications device; and the second communications device providing the requested service only if the indicated source of the current script corresponds to the indicated trusted source and the user authorisation is received.

The user authorisation may comprise an approval of the service request encrypted with a password known to the first communications device and the second communications device.

The second communications device may be a smartphone.

In a further aspect, there is provided a storage medium (e.g.. a non-transitory computer readable storage medium) storing processor-implementable instructions for controlling one or more processors to carry out any of the above aspects.

In a further aspect, there is provided a service provision system, comprising a first communications device and a second communications device; the first communications device being adapted to run, on a web browser running in the first communications device, a script that is from a source that is trusted by a user of the first communications device; the first communications device further being adapted to send a user-verified indication of the trusted source to the second communications device; the first communications further being adapted to send, to the second communications device, the following: a service request, for a service required by script currently running on the web browser, and an indication of the source of the current script; the second communications device being adapted to compare the indicated source of the current script to the indicated trusted source; and the second communications device further being adapted to provide the requested service only if the indicated source of the current script corresponds to the indicated trusted source.

In a further aspect, there is provided a first communications device for requesting a service from a second communications device, the first communications device comprising: a web browser adapted to run a script that is from a source that is trusted by a user of the first communications device; wherein: the first communications device is adapted to send a user-verified indication of the trusted source to the second communications device; and the first communications is further adapted to send, to the second communications device, the following: a service request, for a service required by script currently running on the web browser, and an indication of the source of the current script.

In a further aspect, there is provided a second communications device for responding to a service request from a first communications device; the second communications device being adapted to receive a user-verified indication of a trusted source sent from the first communications device; the second communications device further being adapted to receive, from the first communications device: a service request, for a service required by script currently running on a web browser, and an indication of the source of the current script; the second communications device further being adapted to compare the indicated source of the current script to the indicated trusted source; and the second communications device further being adapted to provide the requested service only if the indicated source of the current script corresponds to the indicated trusted source.

The user-verified indication of the trusted source may comprise an indication of the trusted source encrypted with a password known to the first communications device and the second communications device.

The trusted source may be a remote web server.

A web server running in the second communications device may be adapted to receive the user-verified indication of the trusted source, the service request, and the indication of the source of the current script.

The second communications device may be further adapted to produce a service product, which is forwarded to the first communications device, if the second communications device performs the requested service.

The second communications device may be further adapted to send, to the first communications device, an indication of refusal of the requested service when the requested service is not provided by the second communications device due to the indicated source of the current script not corresponding to the indicated trusted source.

The second communications device may be further adapted to send a user authorisation request to the first communications device; the first communications device may be further adapted to obtain authorisation from the user; the first communications device may be further adapted to send a user authorisation to the second communications device; and the second communications device may be further adapted to provide the requested service only if the indicated source of the current script corresponds to the indicated trusted source and the user authorisation is received.

The user authorisation may comprise an approval of the service request encrypted with a password known to the first communications device and the second communications device.

The second communications device may be a smartphone.

BREIF DESCRIPTION OF THE DRAWING

Embodiments of the invention will now be described, by way of example only, with reference to the accompanying drawings, in which.

DETAILED DESCRIPTION

Figure 1:
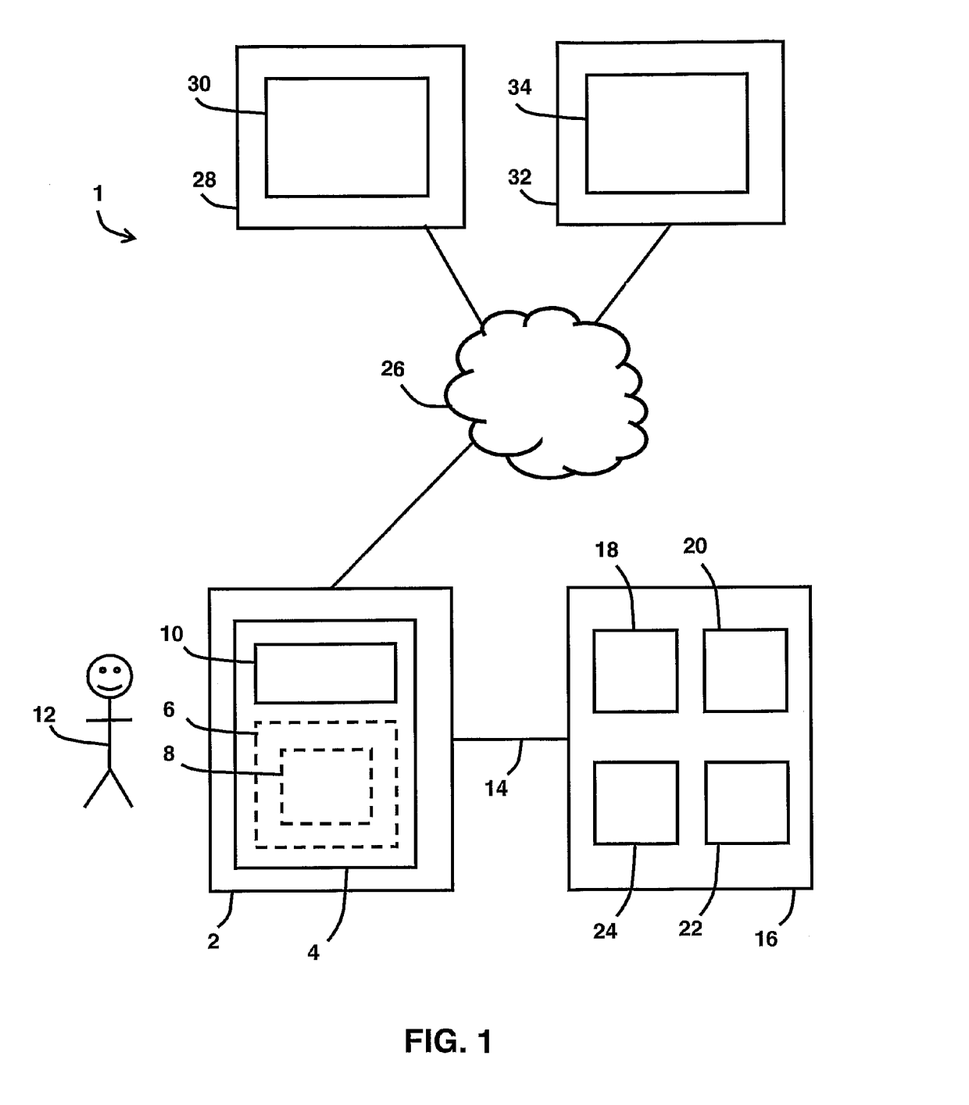
FIG. 1 is a block diagram schematically showing a communications network in which a first embodiment of the invention is implemented.

FIG. 1 is a block diagram schematically showing a communications network 1 in which a first embodiment of the invention is implemented. The communications network 1 comprises a first server 28, a second server 32, the Internet 26, a personal computer (PC) 2, a user 12 of the PC 2, and a smartphone 16.

A first web server 30 is operated by the first server 28, i.e. the first web server 30 is an application implemented by the first server 28, in conventional fashion. The first web server 30 is regarded by the user 12 as being trustworthy, i.e. not to comprise malicious or harmful content, or the first web server 30 hosts a website that the user trusts. Thus, the first web server 30 is hereinafter referred to as the trusted web server 30. Also, the first server 28 is hereinafter referred to as the trusted server 28.

A second web server 34 is operated by the second server 32, i.e. the second web server 34 is an application implemented by the second server 32, in conventional fashion. The second web server 34 is not regarded by the user 12 as being trustworthy, e.g. the second web server or websites hosted by it may not be known to the user. Thus, the second web server 34 is hereinafter referred to as the untrusted web server 34. Also, the second server 32 is hereinafter referred to as the untrusted server 32.

The PC 2 is connected to the smartphone 16 via a Wi-Fi link 14. The PC 2 is connected to the trusted server 28 via the internet 26. The PC 2 is connected to the untrusted server 32 via the internet 26. For convenience all the above described connections are shown in FIG. 1 as implemented at the same time. However, as will be appreciated from details below, the connections are not necessarily all present at the same time.

The PC 2 is operated by the user 12. A web browser 4 is operated by the PC 2, i.e. the web browser 4 is an application implemented by the PC 2. This is implemented in conventional fashion except where described otherwise below.

The web browser 4 comprises a browser helper object (BHO) 10. In this embodiment the browser helper object 10 is provided as a web browser plug-in application that has been added to an existing web browser application to provide additional functionality as described below. The browser helper object runs in a trusted environment (i.e. the web browser 4) and is itself trusted by the user.

In FIG. 1 the web browser 4 is shown comprising trusted content 6 that is downloaded from the trusted server 28 during an embodiment of the authentication process detailed below with reference to FIGS. 2 to 4. The content that is downloaded from the trusted server 28 is referred to here as trusted content 6 because the server the content is received from is trusted by the user 12, as described above.

In FIG. 1 the trusted content 6 from the trusted server 28 is shown to comprise trusted client side script 8 that is implemented by the web browser 4 during the embodiment of the authentication process detailed below with reference to FIGS. 2 to 4. The client side script is referred to here as trusted client side script 8 because the content that comprises the client side script is received from a server that is trusted by the user 12, as described above. In this embodiment the trusted client side script 8 is JavaScript (trademark).

The smartphone 16 is a conventional smartphone except where described otherwise below. In particular, the smartphone 16 is a mobile telephone whose operating system allows third party applications to run on it. As such the smartphone 16 can be considered as comprising a plurality of functional modules in addition to those used for conventional mobile telephone functions. The following particular functional modules comprised by the smartphone 16 are useful for understanding this embodiment: a mobile web server 18, a security module 20, a service module 22, and a user interface 24.

The mobile web server 18 is operated by the smartphone 16, i.e. the mobile web server 18 is an application implemented by the smartphone 16. This is implemented in conventional fashion except where described otherwise below. The mobile web server 18 processes requests and other communications received by the smartphone 16, e.g. from the PC 2 via the Wi-Fi link 14. In performing this processing role, the mobile web server 18 may call upon one or more of the security module 20, the service module 22, and the user interface 24, as required, and as described in more detail below.

The security module 20 performs security processes when requested to do so by e.g. the mobile web server 18. An example of such a security process is generating a "number used once" (nonce) in response to a nonce request.

The service module 22 performs service processes when requested to do so by e.g. the mobile web server 18. An example of such a service process is providing user contacts details stored on the smartphone 16.

The user interface 24 comprises a display screen and a standard smartphone key-pad.

Figure 2:
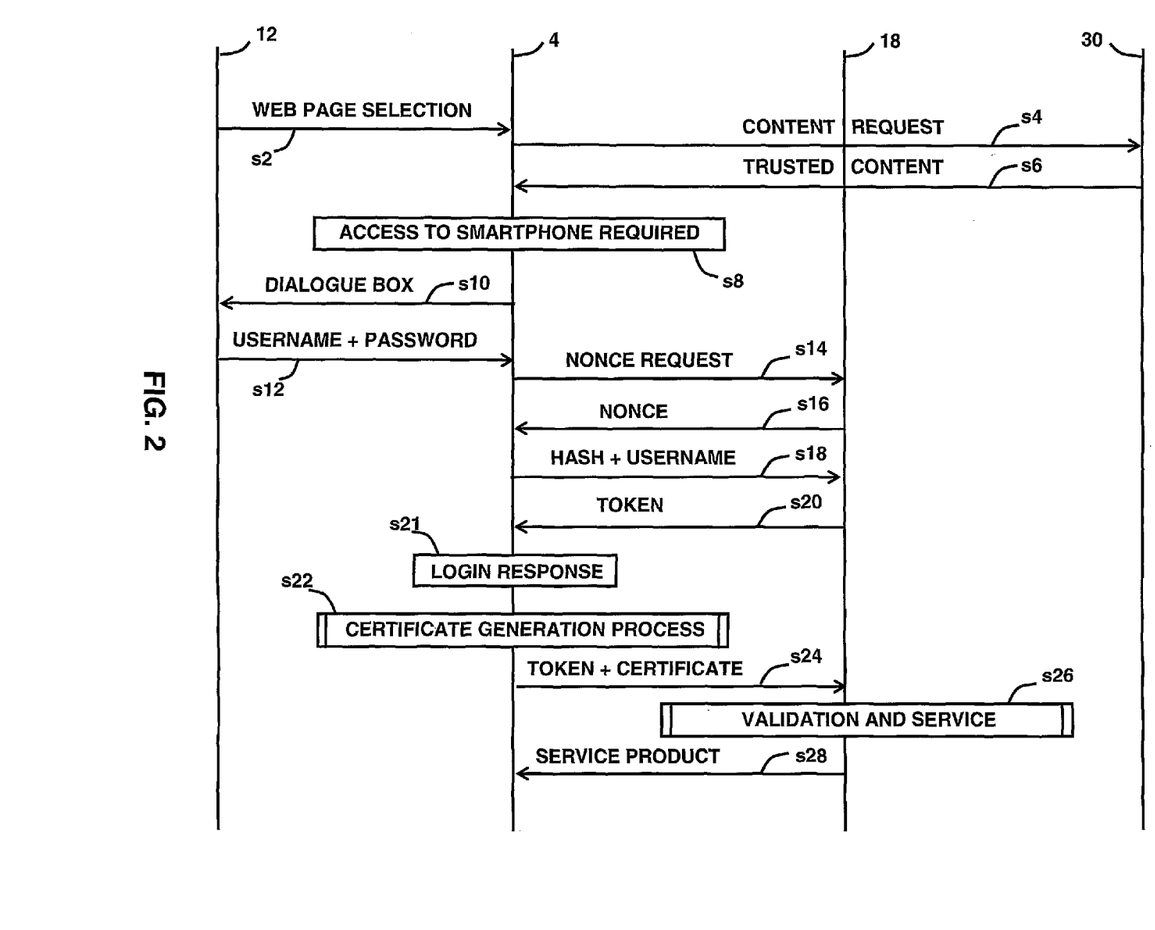
FIG. 2 is a hybrid message sequence chart and process flowchart showing certain messages and steps involved in an embodiment of an authentication process implemented in the communications network.

FIG. 2 is a hybrid message sequence chart and process flowchart showing certain messages and steps involved in an embodiment of an authentication process implemented in the communications network 1. The following entities are shown: the user 12, the web browser 4, the mobile web server 18 and the trusted web server 30.

In this example a first precondition has been fulfilled by the above entities before the start of the process. The first precondition is that the user 12 is registered to use the smartphone 16 e.g. by way of a username and password shared between the user 12 and the smartphone 16. The username and the password are stored in the security module 20 of the smartphone 16. Thereafter, the user 12, on verifying his or her identity by means of the username and the password, is allowed to access and implement services on the smartphone 16, e.g. those stored in the service module 22.

At step s2, the user 12 selects, and enters into the web browser 4 of the PC 2, the URL of a first website, the first website being a website hosted by the trusted web server 30.

At step s4, the web browser 4 sends a content request, hereinafter referred to as the "first content request", to the trusted web server 30. The first content request is in the form of an HTTP request specifying the selected URL.

At step s6, the trusted web server 30 sends a response, hereinafter referred to as the "first response" to the web browser 4. The first response comprises the trusted content 6 previously described with reference to FIG. 1. The trusted content 6 is a HTTP response in the form of a HTML document corresponding to the website of the selected URL.

At step s8, the web browser 4 determines that access to the smartphone 16 will be required. This is carried out as follows.

The web browser 4 processes the first response by running the trusted content 6. The trusted content 6 comprises the trusted client side script 8 as described above with reference to FIG. 1. Thus, the trusted client side script 8 is run by the web browser 4.

The trusted client side script 8 comprises code that calls on services offered by the service module 22 of the smartphone 16, and code that instructs the web browser 4 to log-in to the smartphone 16. Thus, the process of running the trusted client side script 8 determines that the web browser 4 is required to log-in to the smartphone 16. The web browser 4 is required to log-in to the smartphone 16 by the trusted client side script 8 because the trusted client side script 8 requires that a service request, hereinafter referred to as the "first service request", be issued by the web browser 4 to the smartphone 16. The first service request requests the performance of a service process by the service module 22 of the smartphone 16.

A login request, hereinafter referred to as the "first login request", is issued by the trusted client side script 8 to the browser helper object 10. The first login request is a communication indicating to the browser helper object 10 the requirement of the trusted client side script 8 that the web browser 4 becomes logged in to the smartphone 16.

At step s10, the first login request is communicated to the user 12. In this example, the login request is communicated to the user 12 by means of a dialogue box displayed by the PC 2. The dialogue box requires that the username and the password be input by the user 12. The dialogue box displays the identity of the smartphone 16 and an indication of the origin of the trusted client side script 8 (i.e. the trusted web server 30).

At step s12, the user 12 enters the username and the password into the dialogue box and this is input into the web browser 4.

At step s14, a nonce request is issued by the web browser 4 and sent to the mobile web server 18. The nonce request comprises the username, a statement of origin, hereinafter referred to as the "first statement of origin", i.e. a statement that the origin of the trusted client side script 8 is the trusted web server 30, and a request that a nonce is issued to the web browser 4 by the smartphone 16.

The nonce request is passed from the mobile web server 18 to the security module 20. The security module 20 generates a nonce. The nonce comprises a nonce value, and an encryption algorithm. The security module 20 retains a copy of the generated nonce, and also the details of the nonce request. The security module 20 also passes the nonce to the mobile web server 18. At step s16, the mobile web server 18 forwards the nonce to the web browser 4 as the response to the received nonce request.

The web browser 4 receives the nonce from the mobile web server 18. The web browser 4 generates a hash using, amongst other things, the received nonce. The hash is generated by encrypting an information set, hereinafter referred to as the "first information set", with the encryption algorithm contained in the received nonce, and using the earlier received password as a key. The first information set comprises the following: the username, the nonce value, and the first statement of origin. At step s18, the hash and the unencrypted username are sent from the web browser 4 to the mobile web server 18.

The hash and the unencrypted username are passed from the mobile web server 18 to the security module 20. The security module 20 decrypts the hash using the password to extract the first information set, i.e. the username, the nonce value, and the first statement of origin. The security module 20 compares the username extracted from the hash and the received unencrypted username. In this example the extracted username and the unencrypted username are the same, and consequently, the security module 20 generates an authenticated token. The authenticated token comprises an expiration time, i.e. a time at some point in the future after which the authenticated token will become invalid. The security module 20 retains a copy of the authenticated token and passes the authenticated token to the mobile web server 18. At step s20, the mobile web server 18 sends the authenticated token to the web browser 4.

The above described steps s14, s16, s18, and s20 implement a digest authentication process. Digest authentication is fully described in RFC 2617: HTTP Authentication: Basic and Digest Access Authentication, incorporated herein by reference.

The web browser 4 receives the authenticated token and therefore determines that the above mentioned (at step s8) login request issued by the trusted client side script 8 to the browser helper object 10 has been satisfied, and that accordingly the web browser 4 is successfully logged in to the smartphone 16. Thus, at step 21, the browser helper object 10 of the web browser 4 implements a login response comprising informing the trusted client side script 8 of the successful login.

At step s22, a certificate generation process, hereinafter referred to as the "first certificate generation process", is performed by the web browser 4. The first certificate generation process generates an encrypted certificate, hereinafter referred to as the "first certificate". The first certificate comprises an information set, hereinafter referred to as the "second information set". The second information set comprises the following: the first statement of origin, a service instruction, hereinafter referred to as the "first service instruction", to perform a specific service process that the trusted client side script 8 requires the service module 22 of the smartphone 16 to perform, and a sequence number, hereinafter referred to as the "first sequence number". The certificate generation process is described in more detail later below with reference to FIG. 3.

At step s24, the authenticated token and the first certificate are sent from the web browser 4 to the mobile web server 18.

At step 26, the mobile web server performs a validation and service process. The validation and service process results in the mobile web server 18 obtaining or deriving a service product, e.g. user contact details. The service product is the product resulting from the service module 22 of the smartphone 16 performing the first instructed service. The validation and service process is described in more detail later below with reference to FIG. 4.

At step s28, the mobile web server 18 passes the service product to the web browser 4 for use by the trusted client side script 8 which originally requested this service product.

Figure 3:
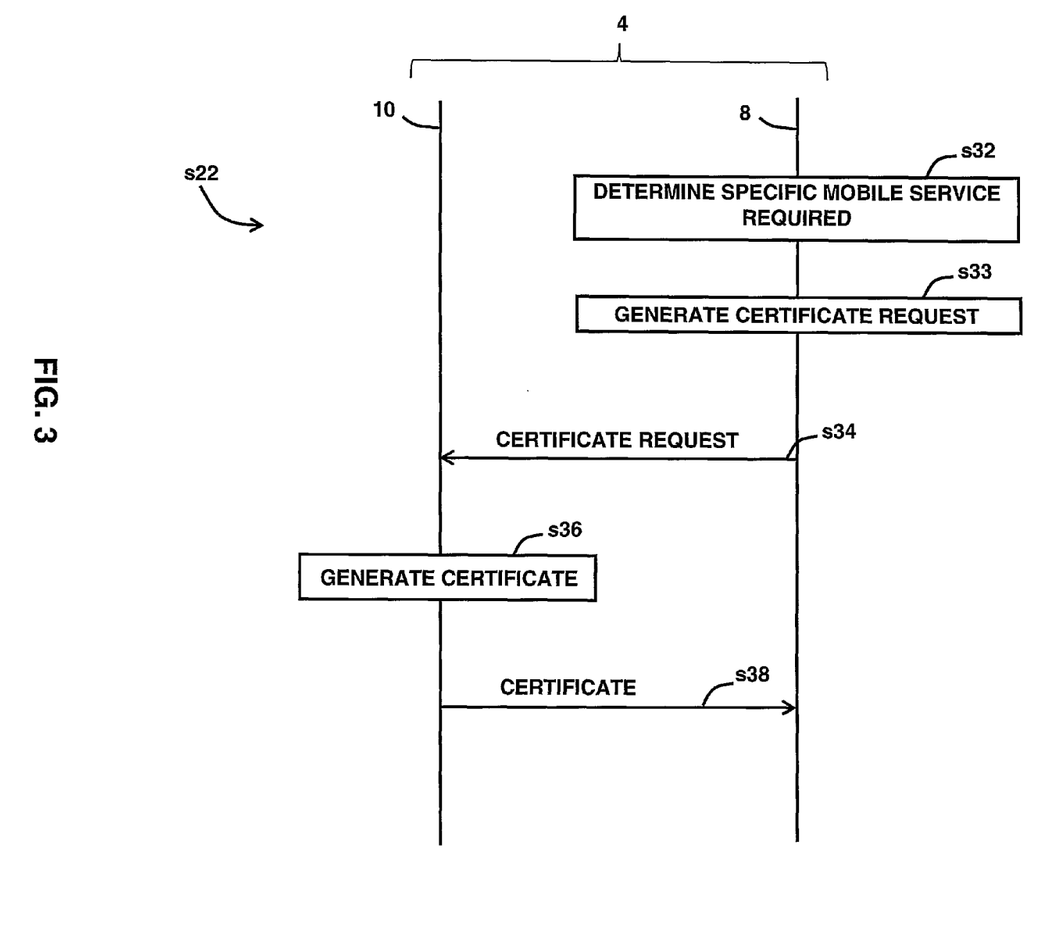
FIG. 3 is a hybrid message sequence chart and process flowchart showing certain messages and steps involved in a first certificate generation process step of the embodiment of an authentication process.

FIG. 3 is a hybrid message sequence chart and process flowchart showing certain messages and steps involved in the first certificate generation process step s22 of the above described embodiment of an authentication process. The following functional parts of the web browser 4 are shown: the browser helper object 10 and the trusted client side script 8.

At step s32, it is determined during the running of the trusted client side script 8 on the web browser 4 that the trusted client side script 8 requires that the first instructed service be performed by the service module 22 of the smartphone 16.

As a result, at step s33 the trusted client side script 8 generates a certificate request. The certificate request comprises the first service instruction, and a request that a certificate be generated.

At step s34, the trusted client side script 8 sends the certificate request message to the web browser helper object 10.

At step s36, in response to the request, the browser helper object 10 generates the first certificate. The first certificate is generated by encrypting the second information set with a standard encryption algorithm, and using the password as a key. In this example, after the generation of the first certificate, the first sequence number is incremented by one. The use and incrementation of the sequence number is for the purpose of attempting to stop replay attacks. This use is preferable but optional, as the embodiment will still provide advantages even when implemented without the use of this sequence number.

At step s38, the browser helper object 10 sends the certificate to the trusted client side script 8, thereby completing step s22.

Figure 4:
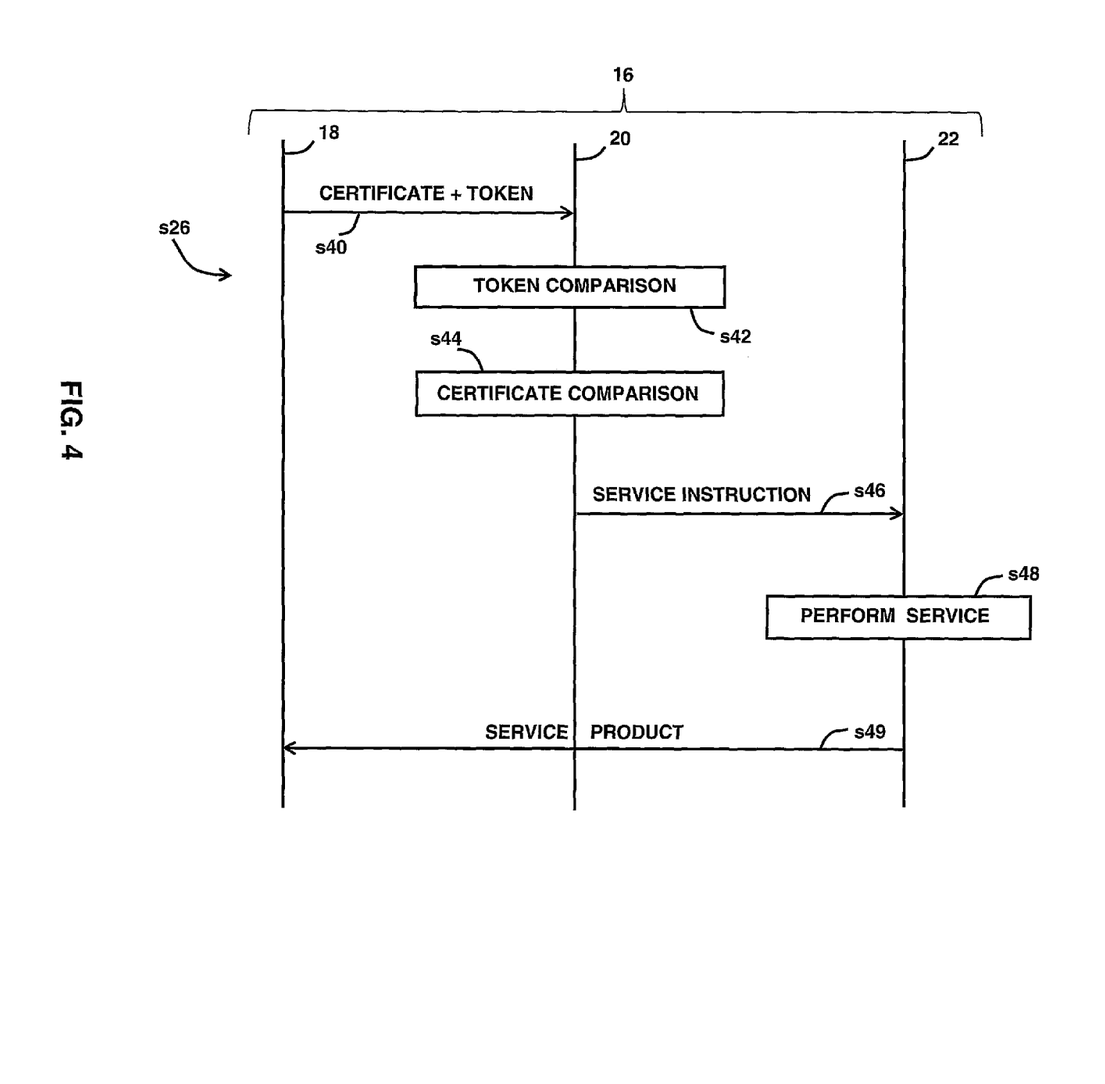
FIG. 4 is a hybrid message sequence chart and process flowchart showing certain messages and steps involved in a validation and service process step of the embodiment of an authentication process.

FIG. 4 is a hybrid message sequence chart and process flowchart showing certain messages and steps involved in the validation and service process step s26 of the above described embodiment of an authentication process. The following functional parts of the smartphone 16 are shown: the mobile web server 18, the security module 20, and the service module 22.

At step s40, the mobile web server 18 passes the authenticated token and the 30 first certificate to the security module 20.

At step s42 the security module 20 compares the received authenticated token to the retained authenticated token. Also, the security module 20 checks the expiration time of the authenticated token to ensure that the authenticated token is still valid.

The security module 20 decrypts the first certificate using the password in order to extract the second information set contained within the first certificate. At step 44, the security module 20 compares the first statement of origin extracted from the first certificate to the first statement of origin retained by the security module 20 as part of the retained nonce request.

In order for the security module 20 to verify the communication it receives (and therefore pass on the service instruction to the service module 22) the authenticated tokens compared at step s42 need to correspond to each other, and the statements of origin compared at step s44 need to correspond to each other. If the compared authenticated tokens do not correspond to each other, and/or the compared statements of origin do not correspond to each other, the security module 20 will deny the associated service instruction.

In this example the received authenticated token and the retained authenticated tokens correspond to each other. Also, in this example, the first statement of origin extracted from the first certificate and the first statement of origin retained by the security module 20 correspond to each other. Thus, the security module 20 determines that the 15 first service request is to be allowed. Consequently, at step s46, the security module 20 passes the first service instruction, which was extracted from the first certificate as described above, to the service module 22.

At step s48, the service module 22 performs the first instructed service. The performance of the first instructed service by the service module 22 results in the service process product.

At step s49, the service module 22 passes the service process product to the mobile web server 18, thereby completing step s26.

The above described example describes a process in which the first service instruction is allowed to be performed by the service module 22 of the smartphone 16. In contrast, an example of a process in which a service instruction is prevented from being performed, i.e. is denied or rejected, will now be described, with reference to FIGS. 5 and 6.

Figure 5:
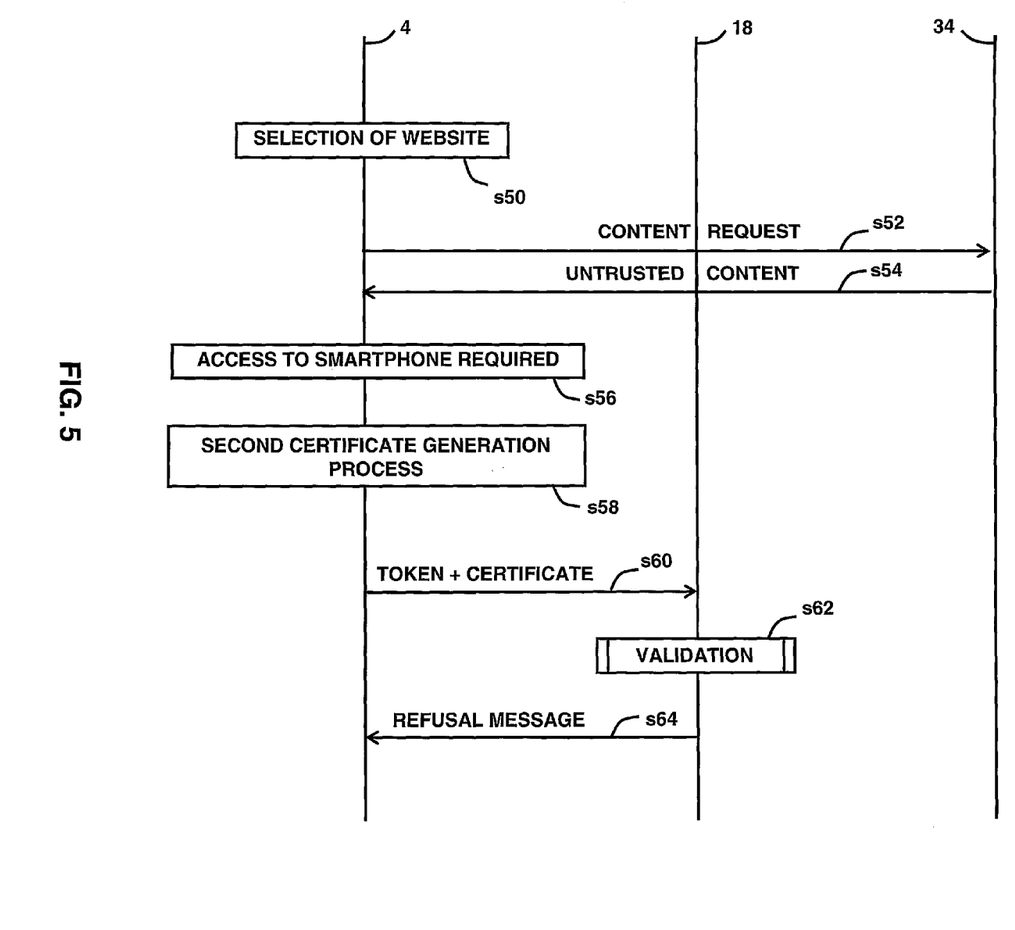
FIG. 5 is a hybrid message sequence chart and process flowchart showing certain messages and steps involved in a process leading to denial or rejection of a service during operation of the communication network.

FIG. 5 is a hybrid message sequence chart and process flowchart showing certain messages and steps involved in a process leading to denial or rejection of a service during operation of the communication network 1, due to "untrusted content" being downloaded from the untrusted web server 34. The content that is downloaded from the untrusted server 34 is referred to here as untrusted content because the server the content is received from is not trusted by the user 12, as described above. The following entities are shown: the web browser 4, the mobile web server 18 and the untrusted web server 34.

In this example a second precondition has been fulfilled by the above entities before the start of the process. The second precondition is that the user 12 is registered to use the smartphone 16, i.e. that the first precondition holds, and that the user 12 has carried out steps s2 to s21 described above with reference to FIG. 2.

At step s50, the web browser 4 selects a second website, the second website being a website hosted by the untrusted web server 34.

At step s52, the web browser 4 sends a content request, hereinafter referred to as the "second content request", to the untrusted web server 34. The second content request is in the form of an HTTP request specifying the second website.

At step s54, the untrusted web server 34 sends a response, hereinafter referred to as the "second response", to the web browser 4. The second response comprises the previously described untrusted content. The untrusted content is an HTTP in the form of a HTML document corresponding to the selected second website.

At step s56, the web browser 4 determines that access to the smartphone 16 will be required. This is carried out as follows.

The web browser 4 processes the second response by running the untrusted content. The untrusted content comprises untrusted client side script. Thus, the untrusted client side script is run by the web browser 4. This client side script is referred to here as untrusted client side script because the content that comprises this client side script is received from a server that is not trusted by the user 12, as described above. In this embodiment the untrusted client side script is JavaScript (trademark). The untrusted client side script comprises code that code that calls on services offered by the service module 22 of the smartphone 16.

The untrusted client side script requires that a service request, hereinafter referred to as the "second service request", be issued by the web browser 4 to the smartphone 16. The second service request requests the performance of a service process by the service module 22 of the smartphone 16.

At step s58, a certificate generation process, hereinafter referred to as the "second certificate generation process" is performed by the web browser 4. The second 30 certificate generation process generates a certificate, hereinafter referred to as the "second certificate". The second certificate comprises an information set, hereinafter referred to as the "third information set". The third information set comprises the following: a statement of origin, hereinafter referred to as the "second statement of origin", i.e. a statement that the origin of the untrusted client side script is the untrusted web server 34; a service instruction, hereinafter referred to as the "second service instruction", to perform a specific service process that the untrusted client side script requires the service module 22 of the smartphone 16 to perform; and a sequence number, hereinafter referred to as the "second sequence number". The second certificate generation process is the same as the first certificate generation process as described in more detail above with reference to FIG. 3, except that the trusted client side script 8 is replaced by the untrusted client side script, the first service instruction is replaced by the second service instruction, and the first certificate is replaced by the second certificate.

At step s60, the web browser 4 passes the authenticated token (obtained as part of satisfying the second precondition) and the second certificate, to the mobile web server 18.

At step 62, the mobile web server performs a validation process. The validation process results in the mobile web server 18 obtaining or deriving a refusal message. The refusal message comprises a statement that the second service request has been refused. The validation process is described in more detail later below with reference to FIG. 6.

At step s64, the mobile web server 18 passes the refusal message to the web browser 4.

Figure 6:
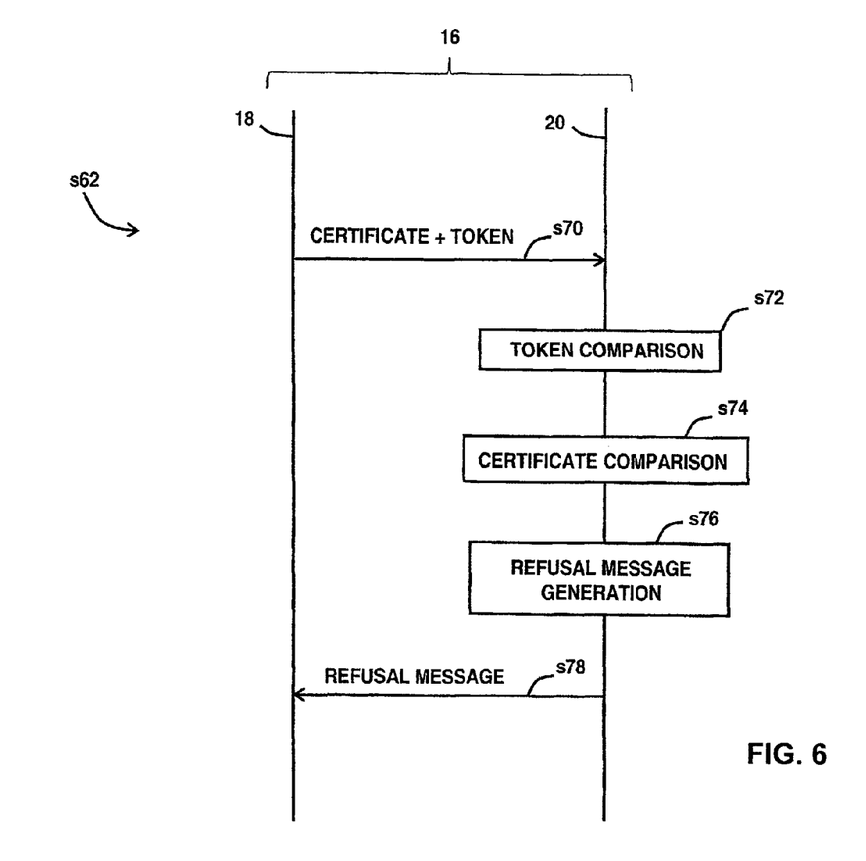
FIG. 6 is a hybrid message sequence chart and process flowchart showing certain messages and steps involved in a validation process step of the process leading to rejection of a service during operation of the communication network.

FIG. 6 is a hybrid message sequence chart and process flowchart showing certain messages and steps involved in the validation process step s62 of the above described process leading to rejection of a service during operation of the communication network 1. The following functional parts of the smartphone 16 are shown: the mobile web server 18, and the security module 20.

At step s70, the mobile web server 18 passes the authenticated token and the second certificate to the security module 20.

At step s72, the security module 20 compares the received authenticated token to the retained authenticated token. Also, the security module 20 checks the expiration time of the authenticated token to ensure that the authenticated token is still valid.

The security module 20 decrypts the second certificate using the password in order to extract the third information set contained within the second certificate. At step 74, the security module 20 compares the second statement of origin extracted from the second certificate to the first statement of origin retained by the security module 20 as part of the retained nonce request.

In order for the security module 20 to verify the communication it receives (and therefore pass on the service instruction to the service module 22) the authenticated tokens compared at step s72 need to correspond to each other, and the statements of origin compared at step s74 need to correspond to each other. If the compared authenticated tokens do not correspond to each other, and/or the compared statements of origin do not correspond to each other, the security module 20 will deny the associated service instruction.

In this example the received authenticated token and the retained authenticated tokens correspond to each other. However, in this example, the second statement of origin extracted from the second certificate and the first statement of origin retained by the security module 20 do not correspond to each other, i.e. the first statement of origin discloses trusted web server 30 as the origin, whereas the second statement of origin discloses the untrusted web server 34 as the origin. Thus, the security module 20 determines that the second service request is to be denied. Consequently, the security module 20 generates the refusal message mentioned earlier with regard to step s62.

At step s78, the security module 20 passes the refusal message to the mobile web server 18, thereby completing step s62.

Thus, the above described processes tend to reduce security risks arising from cross-site scripting. In particular, the above described processes provide that the smartphone 16 will only fulfil service requests received from the PC 2 from script that has been verified as being from an original trusted source that the user 12 has approved whilst operating the PC 2 (by logging in from the PC 2). Thus, the smartphone 16 is protected (when the user is using the PC 2 and this leads to a service being required from the smartphone 16) by the user's approval of the trusted source without the user 12 needing to interact directly with the smartphone 16, for example.

A further optional process of direct user authorisation may be incorporated into the above described process to provide a further embodiment of a cross-site scripting authorisation process. This further embodiment will now be described with reference to FIGS. 7 to 9.

Figure 7:
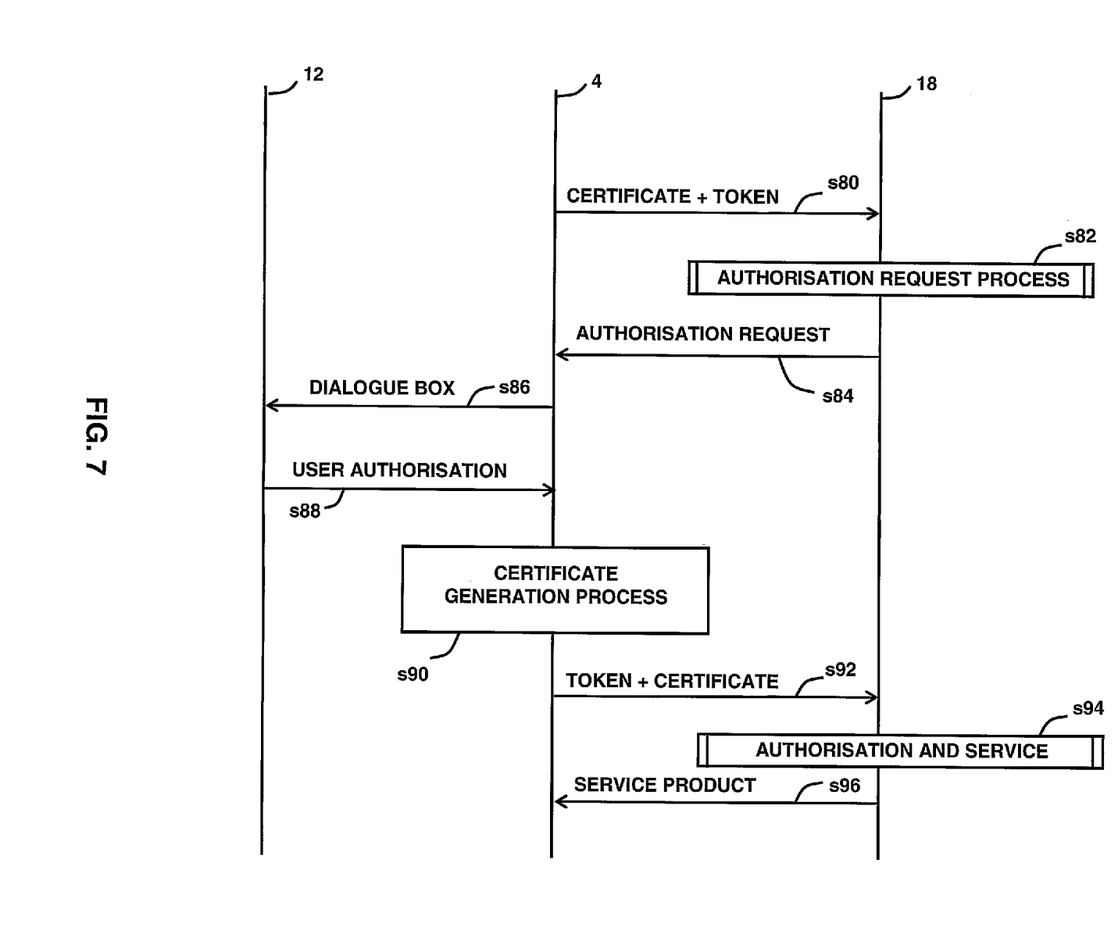
FIG. 7 is a process flowchart showing certain messages and steps involved in a further embodiment of a cross-site scripting authorisation process.

FIG. 7 is a process flowchart showing certain messages and steps involved in a further embodiment of a cross-site scripting authorisation process. The following entities are shown: the user 12, the web browser 4 and the mobile web server 18.

Part of this process is that of the above mentioned entities fulfilling a third precondition. The third precondition is that the user 12 is registered to use the smartphone 16, i.e. that the first precondition holds, and that the user 12 has carried out steps s2 to s22 described above with reference to FIG. 2.

At step s80, the web browser 4 sends the authenticated token and the first certificate to the mobile web server 18.

At step s82, an authorisation request process is performed by the mobile web server 18. The authorisation request process generates an authorisation request. The authorisation request is a message comprising a statement that user authorisation is required in order for the first service instruction, requested by the trusted client side script 8, to be performed by the service module 22 of the smartphone 16. The authorisation request process is, described in more detail later below with reference to FIG. 8.

At step s84, mobile web server 18 passes the authorisation request to the web browser 4.

The web browser processes the authorisation request. The authorisation request informs the trusted client side script 8, running on the web browser 4, that user authorisation is required in order for the first service instruction to be performed. Consequently, the trusted client side script 8 passes the authorisation request to the browser helper object 10.

At step s86, the authorisation request is communicated to the user 12. In this example, the authorisation request is communicated to the user 12 by means of a dialogue box displayed by the PC 2. This dialogue box displays the identity of the smartphone 16, the origin of the trusted client side script 8 (i.e. the trusted web server 30), and the service being requested by the trusted client side script 8, to be performed by the service module 22. This dialogue box requires that the user 12 select an 'OK' button present in the dialogue box if the user wishes to give authorisation.

At step s88, the user 12 selects the 'OK' button present in the dialogue box and this is input into the web browser 4.

At step s90, an authorisation certificate generation process is performed by the web browser 4. The authorisation certificate generation process is performed as follows. In response to the user 12 selecting the 'OK' button present in the dialogue box, the browser helper object 10 generates a certificate, hereinafter referred to as the "authorisation certificate". The authorisation certificate is generated by encrypting an information set, hereinafter referred to as the "fourth information set", with a standard encryption algorithm, and using the password as a key. The fourth information set comprises the first statement of origin, the first service instruction, a so-called user signature (i.e. a statement that the first service instruction has been authorised by the user 12), and a sequence number, hereinafter referred to as the "third sequence number". In this example, after the generation of the authorisation certificate, the third sequence number is incremented by one. The use and incrementation of the sequence number is for the purpose of attempting to stop replay attacks. This use is preferable but optional, as the embodiment will still provide advantages even when implemented without the use of this sequence number. The browser helper object 10 passes the authorisation certificate to the trusted client side script 8.

At step s92, the web browser 4 passes the authorisation certificate and the authenticated token to the mobile web server 18.

At step 94, the mobile web server 18 performs an authorisation and service process. The authorisation and service process results in the mobile web server 18 obtaining or deriving a service product, hereinafter referred to as the "authorised service product". The authorised service product is the product resulting from the service module 10 22 of the smartphone 16 performing the first instructed service following user authorisation. The authorisation and service process is described in more detail later below with reference to FIG. 9.

At step s96, the mobile web server 18 passes the authorised service product to the web browser 4 for use by the trusted client side script 8 which originally requested this service product.

Figure 8:
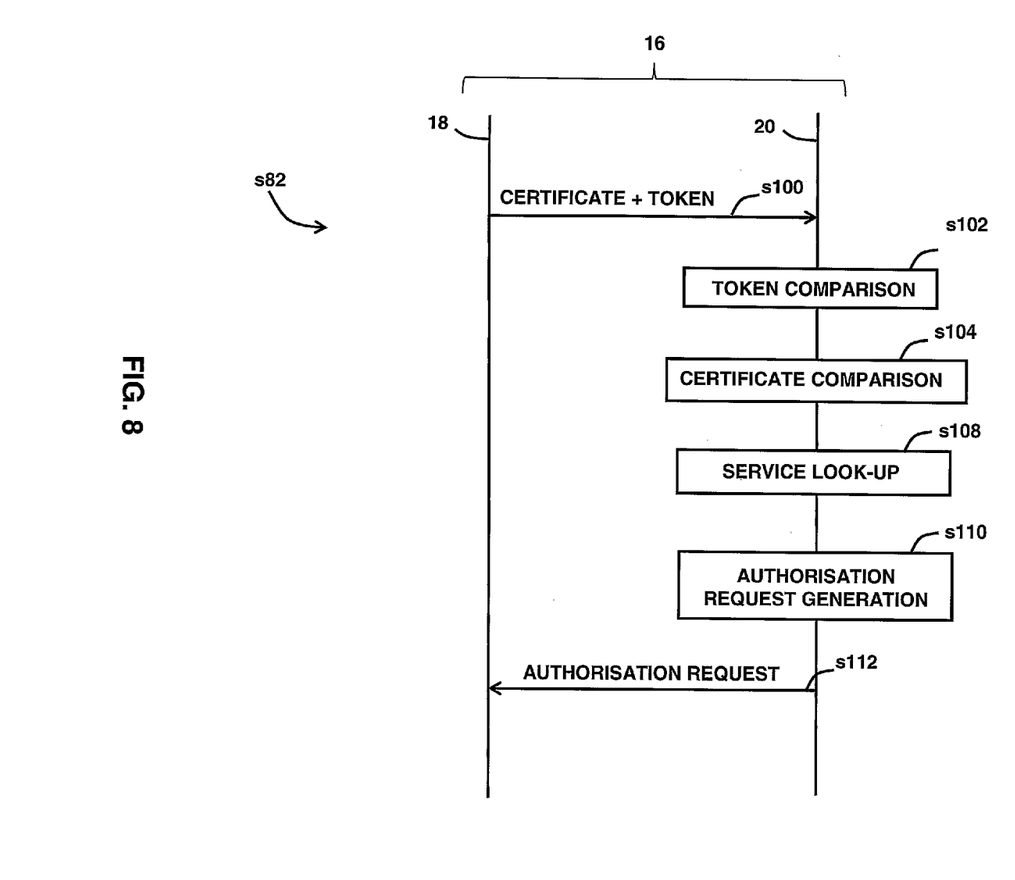
FIG. 8 is a hybrid message sequence chart and process flowchart showing certain messages and steps involved in an authorisation request process step of the embodiment of a cross-site scripting authorisation process described with reference to FIG. 7.

FIG. 8 is a hybrid message sequence chart and process flowchart showing certain messages and steps involved in the authorisation request process step s82 of the above described embodiment of a cross-site scripting authorisation process. The following functional parts of the smartphone 16 are shown: the mobile web server 18, and the security module 20.

At step s100, the mobile web server 18 passes the authenticated token and the first certificate to the security module 20.

At step s102 the security module 20 compares the received authenticated token to the retained authenticated token. Also, the security module 20 checks the expiration time of the authenticated token to ensure that the authenticated token is still valid.

The security module 20 decrypts the first certificate using the password in order to extract the second information set contained within the first certificate. At step 104, the security module 20 compares the first statement of origin extracted from the first certificate to the first statement of origin retained by the security module 20 as part of the retained nonce request.

In order for the security module 20 to verify the communication it receives (and therefore pass on the service instruction to the service module 22) the authenticated tokens compared at step s102 need to correspond to each other, and the statements of origin compared at step s104 need to correspond to each other. If the compared authenticated tokens do not correspond to each other, and/or the compared statements of origin do not correspond to each other, the security module 20 will deny the associated service instruction.

In this example the received authenticated token and the retained authenticated tokens correspond to each other. Also, in this example, the first statement of origin extracted from the first certificate and the first statement of origin retained by the security module 20 correspond to each other. Thus, the security module 20 determines that the first service request is to be allowed.

At step s108, the security module 20 compares the specific service referred to in the first service instruction to a list of services for which direct user authorisation is required, e.g. services for which the user 12 would be charged, e.g. sending an SMS message from the smartphone 16. Note that in this example, there are some services offered by the service module 22 that require direct user authorisation, and other services offered by the service module 22 that do not require direct user authorisation (i.e. the security module 20 discriminates between services that require direct user authorisation and services that do not requires direct user authorisation).

In this example, the specific service referred to in the first service instruction matches or corresponds to one of the services on the list of services for which user authorisation is required. Consequently, at step s110, the security module 20 generates the authorisation request.

At step s112, the security module 20 passes the authorisation request to the mobile web server 18, thereby completing step s82.

Figure 9:
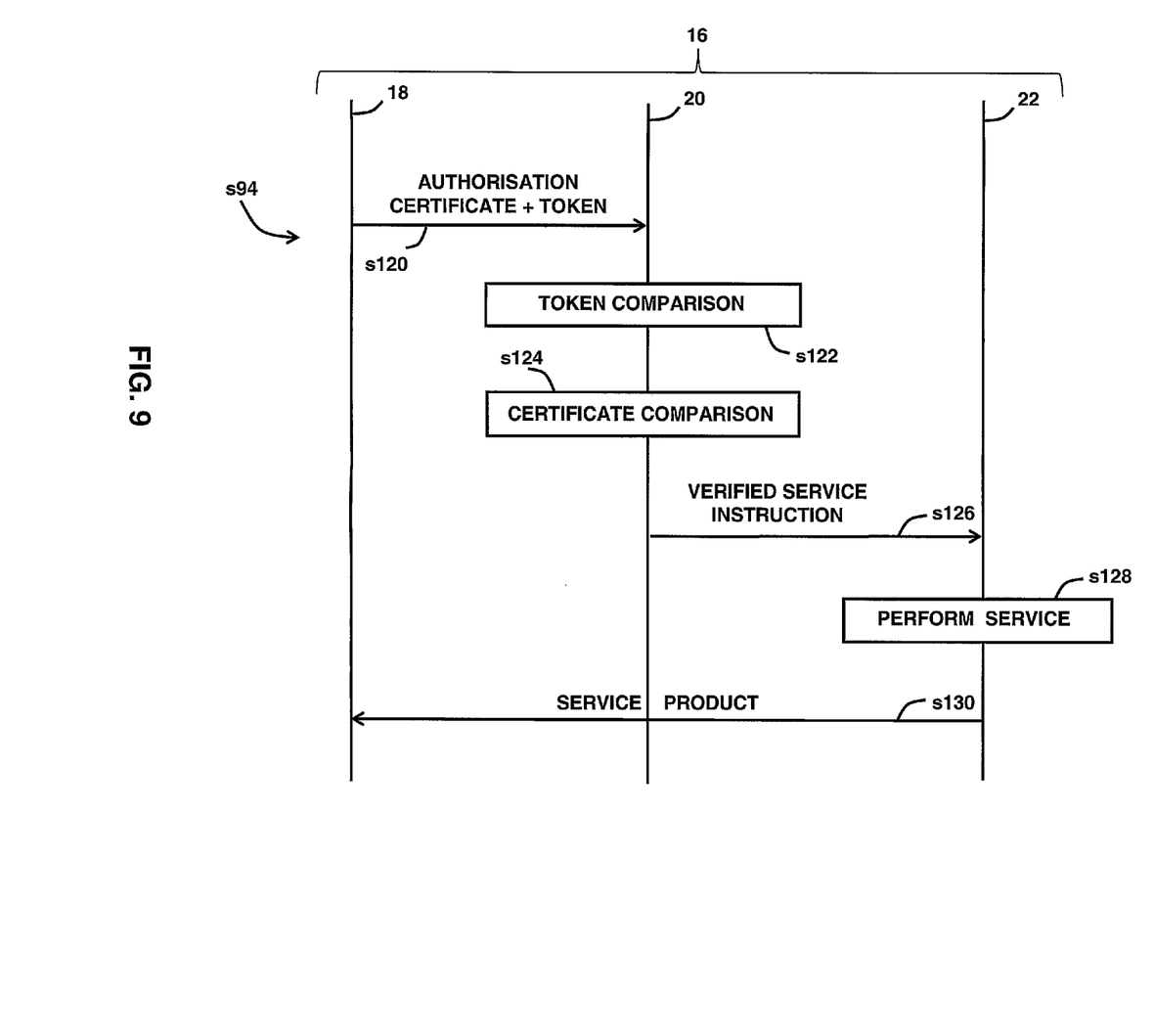
FIG. 9 is a hybrid message sequence chart and process flowchart showing certain messages and steps involved in an authorisation and service process step of the embodiment of a cross-site scripting authorisation process described with reference to FIG. 7.

FIG. 9 is a hybrid message sequence chart and process flowchart showing certain messages and steps involved in the authorisation and service process step s94 of the above described embodiment of a cross-site scripting authorisation process. The following functional parts of the smartphone 16 are shown: the mobile web server 18, the security module 20, and the service module 22.

At step s120, the mobile web server 18 passes the authenticated token and the authorisation certificate to the security module 20.

At step s122 the security module 20 compares the received authenticated token to the retained authenticated token. Also, the security module 20 checks the expiration time of the authenticated token to ensure that the authenticated token is still valid.

The security module 20 decrypts the authorisation certificate using the password in order to extract the fourth information set contained within the authorisation certificate. At step 124, the security module 20 compares the first statement of origin extracted from the authorisation certificate to the first statement of origin retained by the security module 20 as part of the retained nonce request.

In order for the security module 20 to verify the communication it receives (and therefore pass on the service instruction to the service module 22) the authenticated tokens compared at step s122 need to correspond to each other, and the statements of origin compared at step s124 need to correspond to each other. If the compared authenticated tokens do not correspond to each other, and/or the compared statements of origin do not correspond to each other, the security module 20 will deny the associated service instruction.

In this example the received authenticated token and the retained authenticated tokens correspond to each other. Also, in this example, the first statement of origin extracted from the authorisation certificate and the first statement of origin retained by the security module 20 correspond to each other. Thus, the security module 20 determines that the first service instruction is to be allowed. Also, the security module 20 determines from the user signature, extracted from the authorisation certificate, that the first service instruction has been verified by the user 12. Consequently, the security module 20 generates a "verified service instruction", comprising the first service instruction. Then, at step s126, the security module 20 sends a "verified service instruction message", comprising the verified service instruction, to the service module 22. The service module 22 receives the verified service instruction message.

At step s128, the service module 22 performs the first instructed service. The performance of the first instructed service by the service module 22 results in the authorised service product.

At step s130, the service module 22 passes the authorised service product to the mobile web server 18, thereby completing step s94.

In addition to the advantageous effects that tend to be provided by the first embodiment, the above described further embodiment tends to further reduce security risks arising from cross-site scripting. In particular, risks from code maliciously inserted by an untrusted source into script that is being trusted due to its primary source tend to be reduced.

In the above embodiments a request that a service be performed is sent by a PC, and a smartphone carries out the requested service. However, in other embodiments a different type of device sends the request that a service be performed. Further, in other embodiments a different type of device carries out the requested services. In either or both cases, said different type of device may be one or more of the following: a PC, a smartphone, a different type of mobile device, an IP router or a network storage device.

In the above embodiments the PC and the smartphone are connected via a Wi-Fi link. However, in other embodiments other types of link are used, for example a USB cable or a Bluetooth connection In the above embodiments the PC is connected to the trusted and untrusted servers via the Internet. However, in other embodiments the PC is connected to the trusted and untrusted servers via different means, for example a LAN network.

In the above embodiments the PC is connected to a single trusted server. However, in other embodiments the PC is connected to a plurality of trusted servers.

In the above embodiments the PC is connected to a single untrusted server. However, in other embodiments the PC is connected to a plurality of untrusted servers.

In the above embodiments an authentication process is implemented using a browser helper object (BHO) 10 running as a web browser plug-in application in a web browser 4 comprises. However, in other embodiments the authentication process is implemented using a different set-up, for example a different web browser plug-in is used, or the functionality provided by the browser helper object is provided by the web browser itself.

In the above embodiments the trusted client side script 8 is Javascript (trademark). However, in other embodiments the trusted client side script is in a different appropriate format, for example VBScript (trademark), or ActionScript (trademark).

In the above embodiments the untrusted client side script is Javascript (trademark). However, in other embodiments the untrusted client side script is in a different appropriate format, for example VBScript (trademark), or ActionScript (trademark).

In the above embodiments the user interface 24 comprises a display screen and a standard smartphone key-pad. However, in other embodiments the user interface comprises a different appropriate arrangement.

In the above embodiments the smartphone 16 comprises the following functional modules: a mobile web server 18, a security module 20, a service module 22, and a user interface 24. However, in other embodiments the smartphone comprises different appropriate functional modules, for example in another embodiment the smartphone comprises a mobile web server that itself provides the functionality of the functional modules described above.

In the above embodiments HTTP is used. However, in other embodiments other web protocols are used.

In the above embodiments the service module 22 performs the service of providing information on the user's contacts. However, in other embodiments the service module performs at least one different service, such as providing access to smartphone held content, for example: contact information, call log information, SMS messages, or location information (e.g. GPS information, cell information, Wi-Fi access point information), and/or the initiation of actions such as initiating calls or making SMS calls.

In the above embodiments, token comparison processes (steps s42, s72, s102 and s122) are followed by certificate comparison processes (steps s44, 74, 104, and s124). However, in other embodiments one or more of the certificate comparison processes is carried out before the corresponding token comparison process. Further, in other embodiments one or more of the token comparison processes and the corresponding certificate comparison process are carried out concurrently.

In the above embodiments a certificate comprises a statement of origin for a service request. However, in other embodiments the certificate comprises different information identifying the origin of service request.

In the above embodiments, at step s10, the user 12 is presented with a dialogue box displayed by the PC 2. This dialogue box requires that the username and the password be input by the user 12. However, in other embodiments, at step s10, different means of confirming the user's identity are used, for example a Smartcard, an RFID tag or fingerprint recognition.

In the above embodiments, at step s10, the dialogue box displays the identity of the smartphone 16 and the origin of the trusted client side script 8. However, in other embodiments, at step s10, the dialogue box displays different information.

In the above embodiments, at step s86, the user 12 is required to select an 'OK' button present in a dialogue box should they wish to authorise the. However, in other embodiments a different means of confirming user authorisation is used, for example requesting the username and password.

In the above embodiments, at step s86, the dialogue box displays the identity of the smartphone 16, the origin of the trusted client side script 8, and the service being requested by the trusted client side script 8. However, in other embodiments, at step s86, the dialogue box displays different information.

In the above embodiments, at step s50, a second website is selected by the web browser 4. However, in other embodiments the second website is selected by a different method, for example the second website is selected by the user.

In the above embodiments a service product is sent from the service module 22 of the smartphone 16 to the web browser 4 (for example via message steps s28 and s49 and/or message steps s96 and s130). However, in other embodiments a service product is not sent from the service module 22 of the smartphone 16 to the web browser 4. For example in an embodiment in which the requested service is that the smartphone 16 makes a call, no service product as such is generated. Further, in other embodiments a message confirming that a service has been performed is sent from the service module 22 to the web browser 4 in addition to, or instead of, a service product.

In the above embodiments a refusal message is sent from the security module 20 of the smartphone 16 to the web browser 4 (for example via message steps s64 and s78). However, in other embodiments no refusal message is sent.

In the above embodiments, at step s108, the security module 20 compares the specific service referred to in the first service instruction to a list of services for which direct user authorisation is required, e.g. services for which the user 12 would be charged, e.g. sending an SMS message from the smartphone 16. However, in other embodiments the security module 20 compares the specific service to a different set of services that have been specified in a different manner, for example a set of services previously specified by the user.

In the above embodiments, at step s108 there are some services offered by the service module 22 that require direct user authorisation, and other services offered by the service module 22 that do not require direct user authorisation. However, in other embodiments all services require user authorisation.

In the above embodiments a process leading to denial or rejection of a service, due to "untrusted content" being downloaded from the untrusted web server 34, described with reference to FIG. 5, has the precondition that the user 12 is registered to use the smartphone 16, and that the user 12 has carried out steps s2 to s21 described above with reference to FIG. 2. However, this need not be the case, and in other embodiments, the process leading to denial or rejection of a service has a different appropriate precondition, e.g. just that the user 12 is registered to use the smartphone 16.

What is claimed is:

1. A first communications device for requesting a service from a second communications device, the first communications device comprising: a software application configured to run a script that is from a source that is trusted by a user of the first communications device; wherein: the first communications device is configured to send a user-verified indication of the trusted source to the second communications device; and the first communications device is further configured to send, to the second communications device, the following: a service request, for a service required by a script currently running on the software application, and an indication of the source of the currently running script, wherein the user-verified indication of the trusted source comprises an encrypted indication of the trusted source, and wherein the trusted source is a web server remote to the first communications device.

2. A first communications device according to claim 1, further configured to pass to the currently running script a service product of the requested service received from the second communications device.

3. A first communications device according to claim 1, further configured to
obtain from a user of the first communications device an authorization for the second communications device to provide the service; and
send the authorization to the second communications device.

4. A first communications device according to claim 3, wherein the user authorization comprises an approval of the service request encrypted with a password known to the first communications device and the second communications device.

5. A first communications device according to claim 1, wherein the software application is a web browser.

6. A second communications device for responding to a service request from a first communications device; the second communications device being configured to receive a user-verified indication of a trusted source sent from the first communications device; the second communications device further being configured to receive, from the first communications device: a service request, for a service required by a script currently running on a software application in the first communications device, and an indication of the source of the script; the second communications device further being configured to compare the indicated source of the currently running script to the indicated trusted source; and the second communications device further being configured to provide the requested service only if the indicated source of the currently running script is the same as the indicated trusted source, wherein the user-verified indication of the trusted source comprises an encrypted indication of the trusted source, and wherein the trusted source is a web server remote to the second communications device.

7. A second communications device according to claim 6, wherein the indication of the trusted source is encrypted with a password known to the first communications device and the second communications device.

8. A second communications device according to any of claim 6, wherein a web browser running in the second communications device receives the user-verified indication of the trusted source, the service request, and the indication of the source of the current script.

9. A second communications device according to claim 6, wherein, if the second communications device performs the requested service, a service product is produced which is forwarded to the first communications device.

10. A second communications device according to claim 6, further configured to send to the first communications device an indication of refusal of the requested service when the requested service is not provided by the second communications device due to the indicated source of the script not being the same as the indicated trusted source.

11. A second communications device according to claim 6, further configured to send a request for a user authorization to provide the requested service and providing the requested service only if both a) the indicated source of the current script is the same as the indicated trusted source and b) the user authorization is received.

12. A second communications device according to claim 11, wherein the user authorization comprises an approval of the service request encrypted with a password known to the first communications device and the second communications device.

13. A second communications device according to claim 6, wherein the software application is a web browser.

14. A first communications device according to claim 1, wherein the software application is a web browser and wherein the web browser is configured to issue and send to the web server a nonce request, the nonce request comprising a username, a statement of origin indicating that the origin of the script is the web server, and a request that a nonce be issued to the browser by the second communications device.

15. A first communications device according to claim 14, wherein the web browser is configured to receive a nonce from the web server that has previously received the nonce from a security module, and to generate a hash using the received nonce, the nonce comprising a nonce value and an encryption algorithm, and the security module retaining a copy of the generated nonce and details of the nonce request.

16. A first communications device according to claim 15, wherein the hash is generated by encrypting an information set with the encryption algorithm included in the nonce and a password previously entered with the username as a key, the information set comprising the username, the nonce value, and the statement of origin, and wherein the web browser is further configured to send the hash and the username, unencrypted, to the security module via the web server.

17. A first communications device according to claim 16, wherein the security module is configured to decrypt the hash using the password to extract the information set, compare the username extracted from the information set once the hash is decrypted with the received unencrypted username, and determine whether an authenticated token should be passed to the web browser based on the comparison.

* * * * *